Jan. 1, 1935.  E. W. KOEPKE  1,986,441
LOCKING FISH BOBBER
Filed Jan. 15, 1934

Inventor
Ernest W. Koepke,
By G. C. Kennedy.
Attorney

Patented Jan. 1, 1935

1,986,441

UNITED STATES PATENT OFFICE 1,986,441

LOCKING FISH BOBBER

Ernest W. Koepke, Waterloo, Iowa, assignor to Black Hawk Sport Shop, Incorporated, Waterloo, Iowa, a corporation of Iowa Application January 15, 1934, Serial No. 706,706

4 Claims. (Cl. 43—49)

My invention relates to improvements in fishing bobs or floats, and the object of my improvement is to supply means for releasably and adjustably securing a bob on a fish-line in a balanced state thereon.

Another object of my improvement is to provide end locking means for the bob to receive the line detachably, with a plurality of clamping devices for a split bob adjustable thereon to hold the split parts together upon a traversing line.

Figure 1:
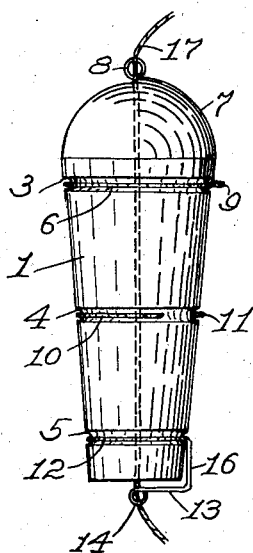
Figure 7:
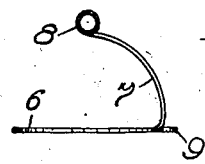
Figure 4:
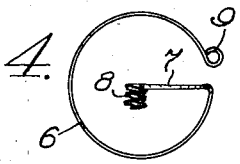
Figure 5:
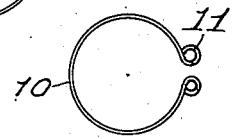
Figure 6:
Figure 8:
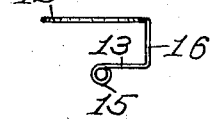
Figure 3:
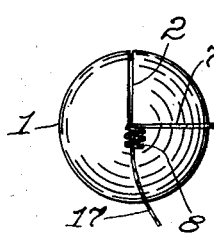
Figure 2:
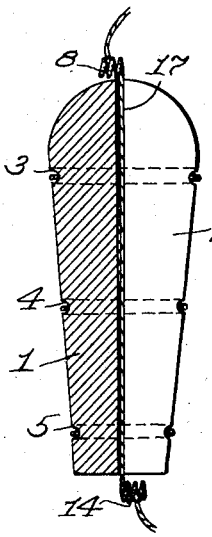

These objects I have accomplished by the means which are hereinafter described and claimed, and which are illustrated in the accompanying drawing, in which Fig. 1 is a side elevation of my invention as assembled for use on a fish-line, and Fig. 2 is a central longitudinal section thereof taken on a plane with the longitudinal split in the bob. Fig. 3 is a top plan of the device. Fig. 4 is a top plan of the top ring, and Fig. 7 is a side elevation thereof. Fig. 5 is a top plan of the middle ring. Fig. 6 is a top plan of the bottom ring, and Fig. 8 is a side elevation thereof.

The bob or float body 1 may be of any suitable material, wood or cork especially, and may be shaped as desired otherwise than that illustrated, and has a longitudinal split along one side extending to the center or axis of the symmetrical body, to permit a fishing line 17 to be drawn through the split to the center of the bob.

The bob 1 may have one or more annular grooves therearound to receive a split ring or rings of resilient wire to yieldingly clamp the split apart faces of the bob together after the seating of the line 17 axially to retain the line in place without escaping because of lateral strains on the line when in use.

Figs. 1 and 2 show an elongated bob having the side split 2, and encircled by the three annular grooves 3, 4 and 5, spaced longitudinally. In Figs. 4, 5 and 6 are shown split rings 6, 10 and 12 which are respectively mounted removably and rockingly in said grooves.

The bob 1 is shown with a hemispherical top. The top ring 6 has one extremity 7 curved upwardly over the top of the bob as in Fig. 7 and is provided with a laterally extending spiral or helix 8, a short resilient spring, which is thus set off to one side of the axis of the bob as shown in Fig. 3. The other extremity of the ring 6 may have or not have an outwardly projected terminal or eye 9 as desired, which may then serve as a finger-piece in rocking or turning the ring around the groove 3 to position the ring split in coincidence with the bob split 2, to permit placing of the line 17 in or removing it from the latter split. The ring may be turned after such an insertion of the line, to cross the split 2 preventing egress of the line, and the resilient compression caused by the ring will clamp the walls of the split together to grasp the line and tend to retain it in its central position.

The same is true as to the lowermost split ring 12, which has one coiled spring termination 14 and another eye-shaped termination 15, the spring 14 likewise being below the bob on the arm parts 16 and 13. The two end rings 6 and 12 suffice to secure the line from escape sidewise, but in an elongated bob such as that shown, the medial ring 10 may be used, having like eye-shaped terminations 11. When the rings have been turned to close the split 2, the line 17 above and below the ends of the bob may be passed through the spring helices 8 and 14, or be given half turns in the coils to releasably lock the line to the bob at both ends thereof.

As the coils are substantially in the line of the axis of the bob, the line is held from escaping at the ends of the split 2, and the bob is thus balanced in use and cannot become displaced from the bob, tilted out of line, nor caught upon obstructions as the helices afford no sufficient projection to catch thereon. The line may be easily removed by reversing the above actions, or shifted for adjusting the bob along the line without removal.

I claim:

1. A locking fishing-bob, comprising in combination, a float having a radial longitudinal side split to receive and seat a fishing-line centrally therethrough, and clamping means mounted on said bob tending to close said split and having projections extending over the bob ends and there coiled to lockingly engage portions of the line.

2. A locking fishing-bob, comprising in combination, a float having a radial longitudinal side split to receive and seat a fishing-line centrally therethrough, and clamping resilient split-rings mounted around the float and having projections extending over the bob ends tending to close said split and having terminal spring coils to lockingly engage said line.

3. A locking fishing-bob, comprising in combination, a float having a radial longitudinal side split to receive and seat a fishing-line centrally therethrough, and having annular grooves therearound, and clamping resilient split-rings removably and turnably mounted in said grooves and having projections extending over the bob ends, said rings tending to close the split and being provided with laterally directed terminal coils to lockingly engage portions of the line.

4. A locking fishing-bob, comprising in combination, a float having a radial longitudinal side split to receive and seat a fishing-line centrally therethrough, and resilient rings turnably mounted upon the bob and split to have certain terminations directed outwardly to serve as fingerholds, and their other terminations carried over the bob ends and helically coiled to lockingly engage portions of the line in the direction of longitudinal strain upon the line.

ERNEST W. KOEPKE.